United States Patent
Streitenberger et al.

(10) Patent No.: US 7,054,979 B2
(45) Date of Patent: May 30, 2006

(54) METHOD AND APPARATUS FOR ROUTING CONFIGURATION ACCESSES FROM A PRIMARY PORT TO A PLURALITY OF SECONDARY PORTS

(75) Inventors: Robert Streitenberger, Hyogo (JP); Hiroyuki Kawai, Hyogo (JP); Yoshitsugu Inoue, Hyogo (JP); Junko Kobara, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 430 days.

(21) Appl. No.: 09/985,009

(22) Filed: Nov. 1, 2001

(65) Prior Publication Data

US 2002/0091888 A1     Jul. 11, 2002

(30) Foreign Application Priority Data

Jan. 5, 2001   (JP) ............................ 2001-000380

(51) Int. Cl.
*G06F 13/14*  (2006.01)
(52) U.S. Cl. ..................................................... 710/305
(58) Field of Classification Search ............... 710/305, 710/20, 312; 345/502
See application file for complete search history.

(56) References Cited

U.S. PATENT DOCUMENTS

| | | | |
|---|---|---|---|
| 5,392,407 A | | 2/1995 | Heil et al. |
| 5,799,207 A | * | 8/1998 | Wang et al. ................... 710/38 |
| 5,859,988 A | * | 1/1999 | Ajanovic et al. ........... 710/306 |
| 6,119,191 A | * | 9/2000 | Neal et al. ................... 710/311 |
| 6,175,888 B1 | * | 1/2001 | Guthrie et al. .............. 710/310 |
| 6,233,641 B1 | * | 5/2001 | Graham et al. ............. 710/316 |
| 6,349,347 B1 | * | 2/2002 | Porterfield .................... 710/10 |
| 6,675,251 B1 | * | 1/2004 | Streitenberger et al. .... 710/306 |
| 6,728,820 B1 | * | 4/2004 | Brian et al. ................. 710/306 |

FOREIGN PATENT DOCUMENTS

| | | |
|---|---|---|
| JP | 6-231073 | 8/1994 |
| JP | 09-237246 | 9/1997 |

OTHER PUBLICATIONS

Gallant, John, Chips help connect host and expansion buses to the PCI bus, 1995, EDN v40 n 3 Feb. 2, 1995 5pp.*
H.W. Wilson, Triple-port PCI-to-PCI bridge increases support for system expansion slots May 29, 2000 Electronic Design v. 48 p. 60-62.*

* cited by examiner

*Primary Examiner*—Rehana Perveen
*Assistant Examiner*—Christopher A. Daley
(74) *Attorney, Agent, or Firm*—McDermott Will & Emery LLP

(57) ABSTRACT

The method of routing configuration accesses applied from the primary port to a plurality of secondary ports includes the steps of: distributing a plurality of configuration accesses received from the primary bus to the plurality of secondary ports in accordance with a predetermined algorithm, such that each of the devices on the secondary ports receives and responds to exactly a single access; and terminating configuration cycles after distributing the plurality of configuration accesses.

20 Claims, 13 Drawing Sheets

Fig.4 PRIOR ART

| 31 RESERVED 24 | 23 BUS NUMBER 16 | 15 DEVICE NUMBER 11 | 10 FUNCTION NUMBER 8 | 7 REGISTER NUMBER 2 | 1 0 | 0 1 |

METHOD AND APPARATUS FOR ROUTING CONFIGURATION ACCESSES FROM A PRIMARY PORT TO A PLURALITY OF SECONDARY PORTS

BACKGROUND OF THE INVENTION

1. Field of the Invention

The present invention relates to a bus bridges and, more particularly, it relates to a primary-to-secondary bus bridge supported by an existing BIOS (Basic Input/Output Standard) and allowing controlling of a plurality of devices on the secondary bus including a VGA (Video Graphics Array) device through the primary bus.

2. Description of Background Art

A PCI (Peripheral Component Interconnect) bus is now widely used in personal computers. PCI is a bus standard advocated by Intel Corporation, of which specification is determined and published by PCI Special Interest Group (PCI SIG) of the United States. According to the PCI bus standard, a device participating in PCI data transfer is referred to as an "agent." According to PCI standard, agents are controlled by BIOS executed by a CPU (Central Processing Unit), by a device driver and so on. PCI bus standard provides automatic configuration capability of automatically sensing a device connected to the bus at the time of power-on and preparing system environment such as memory mapping for each system.

Recently, as personal computers come to have ever improved performance, it comes to be a common practice to execute, by a personal computer, image processing programs and the like, which have conventionally been executed by a workstation. For this purpose, an LSI (semiconductor Large Scale Integrated circuit) for performing such a specific processing is often connected to a host CPU through a PCI bus in the personal computer. Implementation of a plurality of PCI devices in the integrated circuit is desirable in some cases. At that time, it is necessary to interface the PCI bus of the host with a PCI bus of an added device. Here, the PCI bus in the host CPU is called a primary PCI bus, and the PCI bus of a circuit (add-in board) connected to the primary PCI bus is called a secondary PCI bus.

If a secondary PCI bus is connected to the primary PCI bus and a plurality of PCI agents are connected to the secondary PCI bus, it is necessary for the host to control PCI agents independent from each other. For this purpose, PCI standard employs data called a PCI configuration header. The header includes two types, i.e., "Type 0" and "Type 1". "Type 0" header is recognized by the host CPU as one PCI agent, and "Type 1" header is prepared for the PCI-to-PCI bridge.

The "PCI-to-PCI Bridge Architecture Specification" (Rev. 1.1) specifies in detail the implementation of a configuration "Type 1" header into a PCI-to-PCI bridge device. The configuration address format of the "Type 1" is shown in FIG. 4 and will be described in detail later in the detailed description of the embodiments of the present invention. The specification provides a universal configuration methodology for all systems, given the BIOS supports the "Type 1" format.

Referring to FIG. 1, a typical PCI-to-PCI bridge 250 of the prior art includes a primary port connected to a primary bus 42, and a secondary port 254 connected to a secondary bus 44. The PCI-to-PCI bridge 250 further includes a bridge core 252, provided between primary port 60 and secondary port 254, for interfacing the primary bus 42 and the agents connected to secondary bus 44 such as agents 260, 262, 264.

As shown in FIG. 4, one of the restrictions of the PCI-to-PCI bus bridge according to the specification is that only a single secondary port 254 is defined that is shared by all PCI agents (agents 260, 262, 264), located on the secondary bus 44. If one tries to build an AGP (Accelerated Graphics Port)-to-AGP bridge upon this specification, a major problem emerges.

AGP is an interface targeted to 3D graphical display applications advocated by Intel Corporation, operating upon a PCI bus architecture. AGP standard includes electrical specification of the hardware, specification of the signals used, and the specification of the protocols.

Operational modes of AGP includes a normal operational mode in a normal transfer rate (1× transfer mode) as well as 2× transfer mode or 2× mode wherein data are transferred at twice the normal rate, and 4× transfer mode or 4× mode wherein data are transferred at four times the normal rate. Since AGP 2× and especially AGP 4× introduce very strict electrical and timing constraints, a shared port as shown in FIG. 1 is not a feasible option. Thus, two or more dedicated secondary ports have to be implemented as shown in FIG. 2.

Referring to FIG. 2, the PCI-to-PCI bridge 270 will include a primary port 60, first secondary port (Port A) 64 and a second secondary port (Port B) 66. The PCI-to-PCI bridge 270 will further include a bridge core, provided between primary port 60 and secondary ports 64 and 66 for interfacing the primary bus 42 connected to primary port 60 and the secondary buses 44A and 44B connected to port A 64 and port B 66, respectively.

This way, an AGP device, e.g. device 260, does not have to share a port with other agents, but can own a port, e.g., port A 64, exclusively. The other port can be populated with a plurality of PCI devices. Of course, the bridge should also be usable as a pure PCI bridge, i.e., it should operate with only PCI devices hooked to the secondary ports.

Finally, if an AGP device is operated in a lower data rate, such as AGP 1× or AGP 2×, a shared port is feasible if special care is taken during the system design.

A problem with a plurality of secondary ports is that the bridge has to know to which port to route configuration accesses during configuration cycles after boot-up. In contrast to memory access, where the dispatching is governed by the memory maps, the only information provided with configuration accesses is the Device Number in the "Type 1" address format. The Bios starts reading from device number 0 and increments its way upwards until it encounters a master abort error (MAE) where the secondary port response indicates that no device is responding.

Since the AGP-to-AGP bridge will have two decoupled ports, it will have to start on one port, i.e., port A. If the bridge does not know when it exceeds the number on devices on port A, the device number will be too high resulting in a master abort error and the BIOS will conclude its screening.

However, the devices on port B have not been scanned yet. Thus, they will not be configured by the BIOS and the system resources only will be allocated for port A. The problem will be also encountered if the bridge includes two or more secondary ports. The problem is not restricted to a PCI-to-PCI bridge. Still further, if a bridge has two or more secondary ports, two or more VGA devices may be connected to the secondary ports. At the present, a VGA device that first responds is used as a display during the boot-up. There is no way for the user to preselect a VGA device that the user prefers to use during the boot-up.

SUMMARY OF THE INVENTION

Therefore, an object of the present invention is to provide a method and an apparatus that enable the BIOS to detect all the devices on all ports at the configuration time in a bus-to-bus bridge having two or more secondary ports.

Another object of the present invention is to provide a method and an apparatus that enables the BIOS to detect all the devices on all ports and detect the last of the ports at the configuration time in a bus-to-bus bridge having two or more secondary ports.

Still another object of the present invention is to provide a method and an apparatus that enables the BIOS to detect all the devices on all ports at the configuration time in a bus-to-bus bridge having two or more secondary ports, in accordance with a manual input by a user.

A method according to one aspect of the present invention is used in a bridge for interfacing a device on a primary bus connected to a primary port with devices on a plurality of secondary ports including a first secondary port and a second secondary port. The secondary ports are respectively connected to separate secondary buses. The configuration accesses each designate a device number and request a response from a device having the device number; and each of devices assumed to be connected to the plurality of secondary ports has a capability of responding to a configuration access designating a device number of its own. The method of routing configuration accesses applied from the primary port to the plurality of secondary ports includes the steps of: distributing a plurality of configuration accesses received from the primary bus to the plurality of secondary ports in accordance with a predetermined algorithm, such that each of the devices on the secondary ports receives exactly a single access; and terminating configuration cycles after distributing the plurality of configuration accesses.

Preferably, the step of distributing includes the step of repeating, for each of the secondary ports, the step of applying a respective predetermined number of consecutive configuration accesses received from the primary bus to the each of the secondary ports.

More preferably, the step of distributing may include the step of repeating, for each of the secondary ports except the second secondary port, the steps of: applying a respective predetermined number of consecutive configuration accesses received from the primary bus to the each of the secondary ports except the second secondary port; and repetitively applying subsequently applied configuration accesses to the second secondary port until the second secondary port generates an error signal.

Preferably, the step of distributing may include the steps of: receiving an external signal that represents numbers of devices on each of the plurality of the secondary ports; repeating, for each of the secondary ports, the step of applying a respective number of consecutive configuration accesses received from the primary bus to the each of the secondary ports. The respective number may be equal to the number represented by the external signal for the each of the secondary ports.

In the alternative, the step of distributing may include the steps of: receiving an external signal that represents numbers of devices on each of the plurality of the secondary ports except for the second secondary port, repeating, for each of the secondary ports except for the second secondary port, the step of applying a respective number of consecutive configuration accesses received from the primary bus to the each of the secondary ports, respective number being equal to the number represented by the external signal for the each of the secondary ports except for the second secondary port, and repetitively applying subsequently applied configuration accesses to the second secondary port until the second secondary port generates an error signal.

Preferably, the step of distributing may include the step of: repeating the step of routing a plurality of configuration accesses received from the primary bus to the secondary ports in a predetermined order so that each of the secondary ports receives exactly the same number of accesses, until one of the secondary ports generates an error signal.

A method according to another aspect of the present invention is used in a bridge for interfacing a device on a primary bus connected to a primary port with devices on a plurality of secondary ports respectively connected to separate secondary buses. The method of determining a display device that operates in accordance with a basic specification utilized in system boot-up, includes the steps of: receiving a programmable signal designating one of the plurality of secondary ports, and routing, in response to a device access related to the display device from the primary port in a boot-up of the system, the access to a secondary port designated by the programmable signal.

Yet another aspect of the present invention is directed to an apparatus used in a bridge for interfacing a device on a primary bus connected to a primary port with devices on a plurality of secondary ports including a first secondary port and a second secondary port. The secondary ports are respectively connected to separate secondary buses. The configuration accesses each designate a device number and request a response from a device having the device number. Each of devices assumed to be connected to the plurality of secondary ports has a capability of responding to a configuration access designating a device number of its own. The apparatus of routing configuration accesses applied from the primary port to the plurality of secondary ports includes a circuit that distributes a plurality of configuration accesses received from the primary bus to the plurality of secondary ports in accordance with a predetermined algorithm, such that each of the devices on the secondary ports receives exactly a single access; and a circuit that terminates configuration cycles after distributing the plurality of configuration accesses.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a type 1 configuration header.

DESCRIPTION OF THE PREFERRED EMBODIMENTS

Depending on the system constraints, the following solutions to the aforementioned problems are possible. The system may be a closed system where the number of devices on each port is fixed and an open system where the number of devices on each port is not fixed. For each of these systems, there may be several approaches. Although the bridges in the following embodiments all have two secondary ports, those skilled in the art will readily understand how to implement a bridge with three or more secondary ports.

First Embodiment

In the first embodiment, the number of devices on each port is fixed. Thus, the first embodiment is a closed system and the dispatch algorithm can be hardwired or implemented by software as desired.

Figure 1:
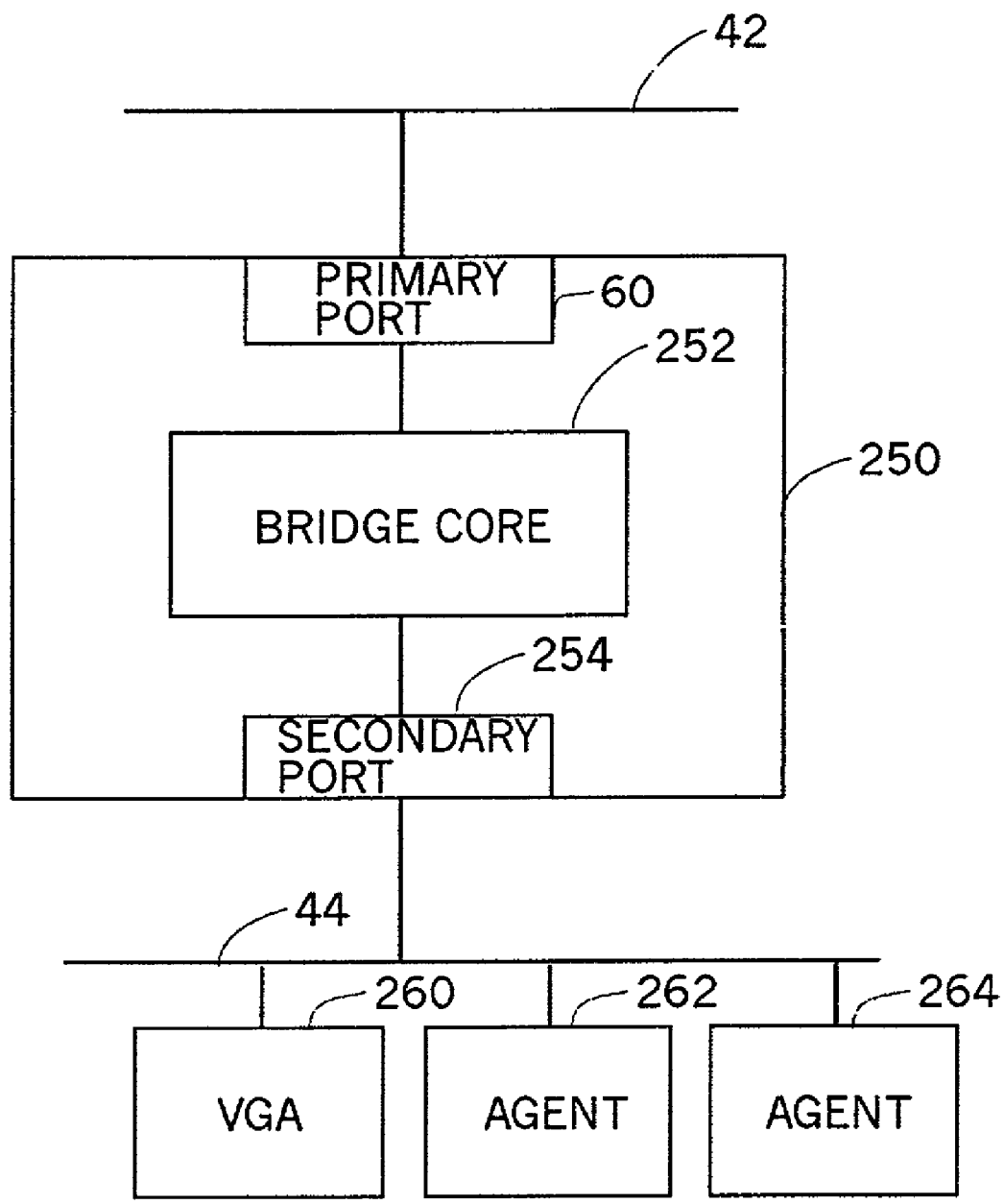
FIG. 1 shows overall structure of the bridge of the prior art.
Figure 2:
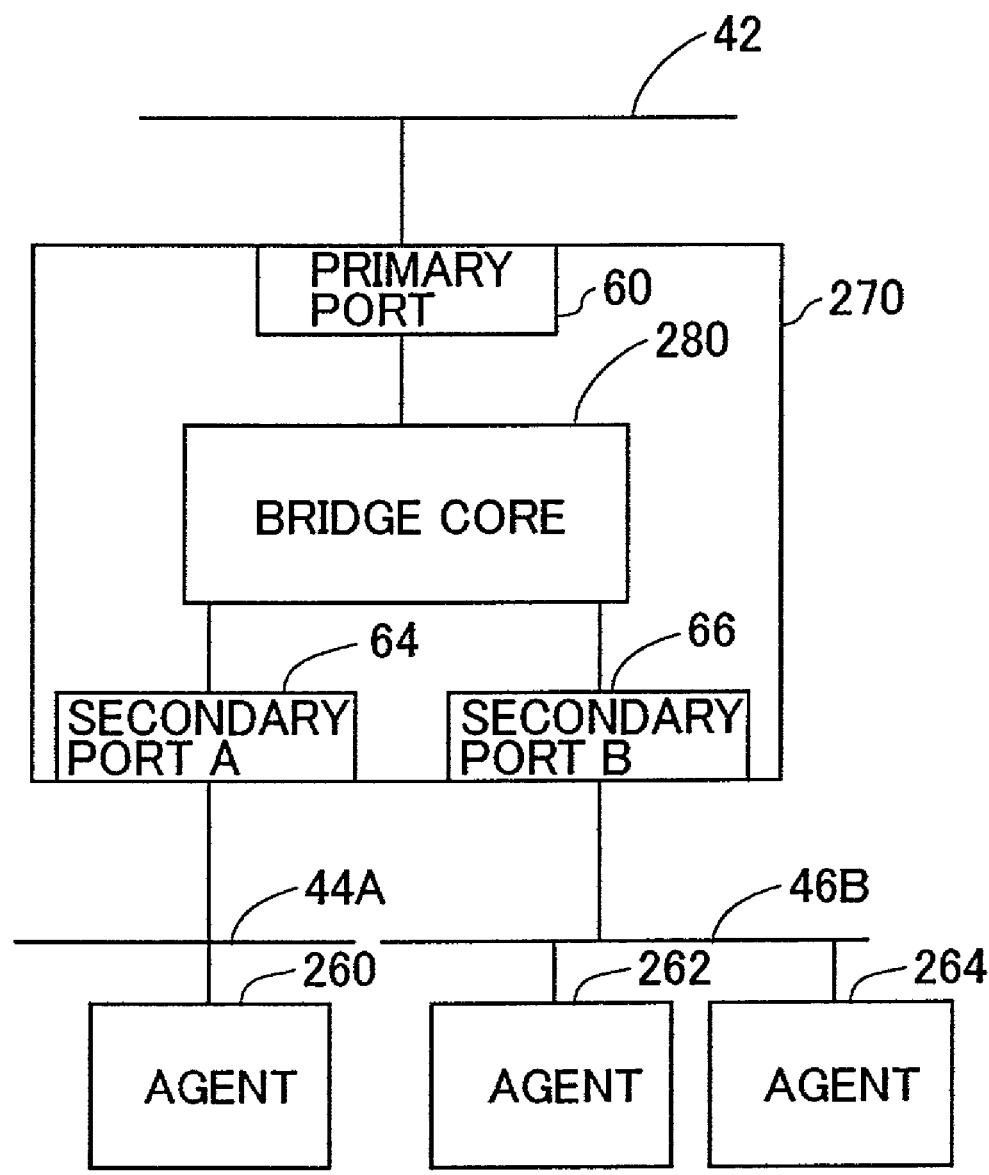
FIG. 2 shows overall structure of the bridge of the related art having two secondary ports.
Figure 3:
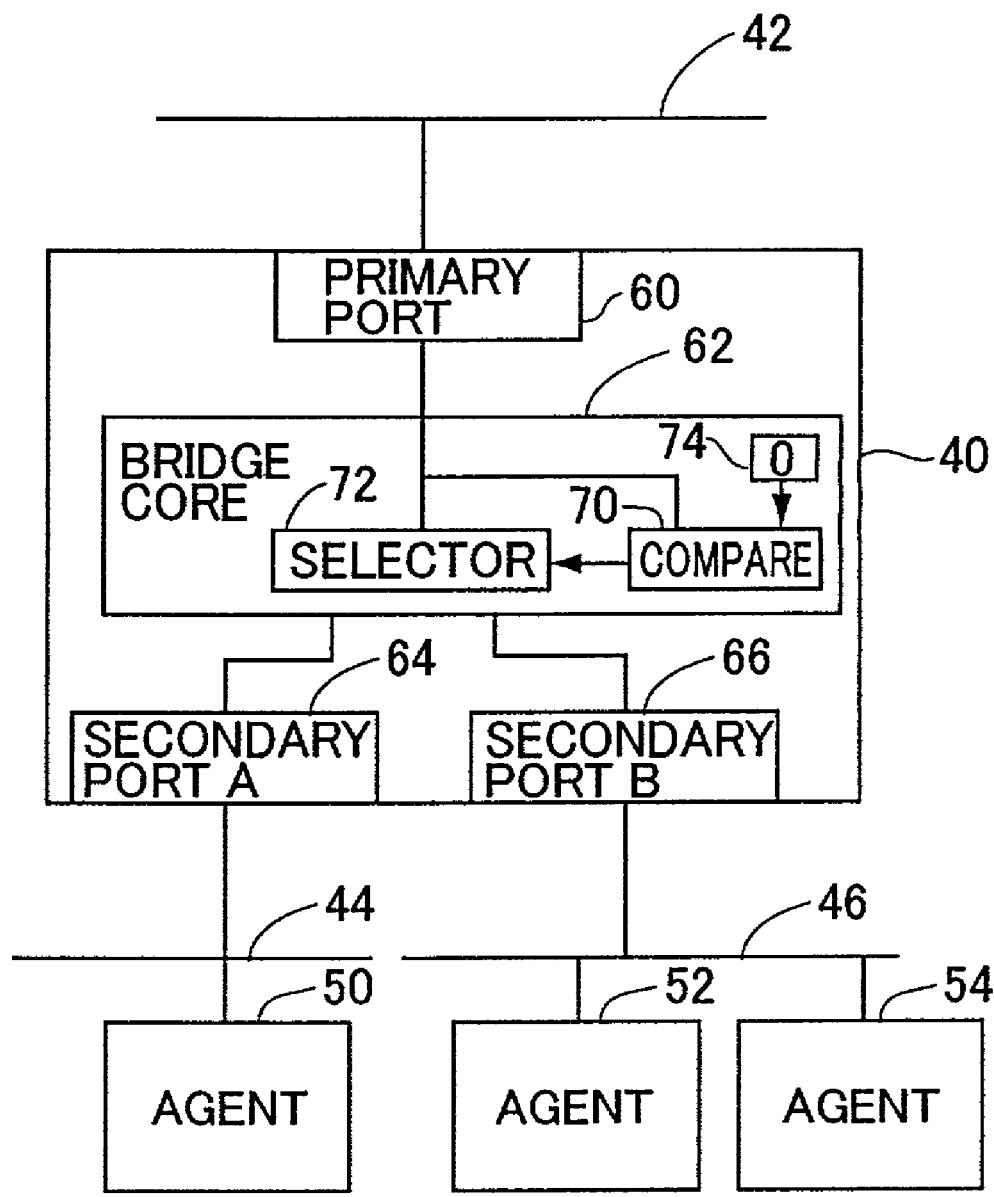
FIG. 3 schematically shows an overall system including a bridge of the first embodiment of the present invention.

Referring to FIG. 3, a PCI-to-PCI bridge 40 of the first embodiment of the present invention includes a primary port 60, a first secondary port (port A) 64, a second secondary port (port B) 66, and a bridge core 62. The bridge core 62 has a capability of switching of the routing of configuration accesses from first secondary port 64 to second secondary port 66 after exactly one configuration access has been routed to each of a predetermined, fixed number of devices connected to first secondary port 64 at the time of configuration by the BIOS.

In bridge core 62, that circuitry related to the routing of configuration accesses includes a circuit 74 for outputting a value "zero" by a hardwired logic, and a compare circuit 70. The compare circuit 70 compares the bits corresponding to a device number within the "Type 1" configuration access applied from primary bus 60 with the value "zero" outputted from circuit 74. Compare circuit 70 outputs a signal that assumes a high level when there is a match and a low level when there is no match. The bridge core 60 further includes a selector 72 for routing the configuration accesses to port A 64 when the output of compare circuit 70 is at the high level, and to port B 66 when the output of compare circuit 70 is at the low level.

FIG. 4 shows an address format 80 of a type 1 configuration access. Referring to FIG. 4, address format 80 includes 32 bits. Address bits (hereinafter, simply referred to as "AD")[31::24] are reserved. AD[23::16] is a bus number, AD[15::11] is a device number. AD[10::8] is a function number. AD[7::2] is a register number. AD[1::0] indicates the type of the address format, and its value in this case is binary "01".

Figure 5:
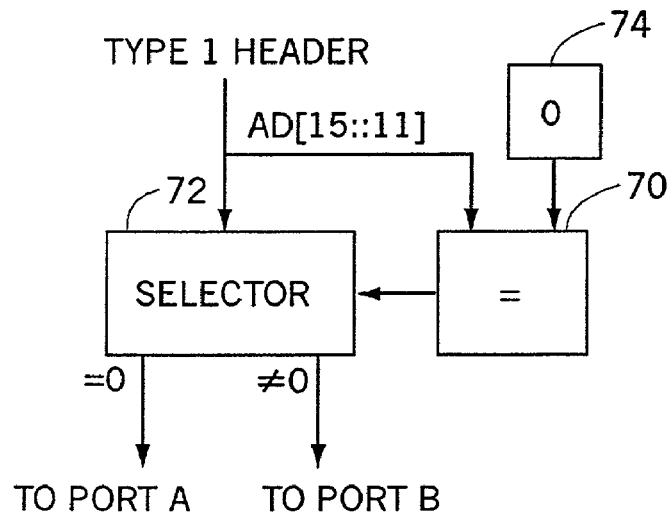
FIG. 5 is a block diagram of the circuit portion of the bridge according to the first embodiment of the present invention related to dispatching of configuration accesses.

FIG. 5 shows that portion of the bridge core 62 related to routing of the configuration accesses. Referring to FIG. 5, compare circuit 70 compares the value "zero" outputted from circuit 74 with the device number AD[15::11] of the type 1 configuration access header. If they match, the output of compare circuit attains the high level. Selector 72 routes the configuration access to port A 64 if the output of compare circuit 70 is at the high level. If the output of compare circuit 70 is at the low level, selector 72 routes the configuration access to port B 66.

Figure 6:
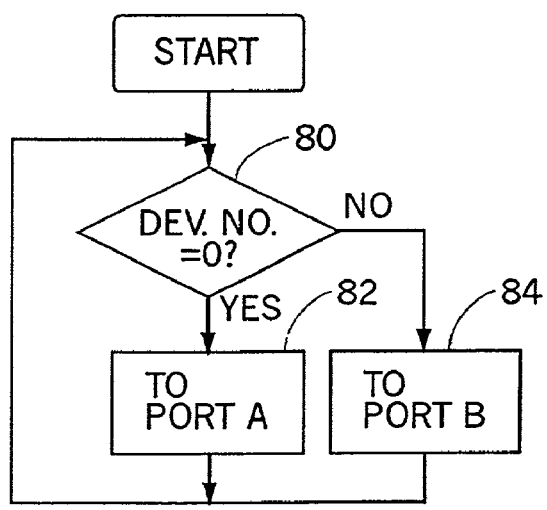
FIG. 6 is a flow chart showing operation of the circuit related to dispatching in the first embodiment.

More specifically, as shown in FIG. 6, it is determined whether the device number equal to zero or not (80) and if it is zero, the configuration access is routed to port A 64 (82) and the next type 1 configuration access is waited for. If the device number is not a zero, the configuration access is routed to port B 66 (84), and the next configuration access is waited for. If a Master Abort Error (MAE) is encountered, then the process is terminated.

When selector 72 routes the configuration accesses to the secondary ports, selector 72 refers to the AD[15::11] of the inputted primary address, i.e., the device number, and sets the corresponding bit within AD[31::16] of the secondary address to "1" and clears all other bits in accordance with the PCI specification. For instance, if the device number AD[15::11] is "0", then AD[31::16] of the secondary address are set to binary "0000 0000 0000 000 1", if the device number AD[15::11] is "1", then AD[31::16] of the secondary address are set to binary "0000 0000 0000 0010", and so on.

Each of the PCI agents connected to the secondary ports has an IDSEL pin for selecting that agent, to which a respective, specific bit of the secondary address is connected. The type 1 head with a device number "0" is routed to port A 64 by the above-described mechanism. Therefore, by connecting AD[16] of the secondary address to the IDSEL pin of an agent 50 connected to port A 64, agent 50 will respond to the configuration access with a device number "0".

Those type 1 headers with a device number equal to or larger than "1" are routed to port B 66 by the above-described mechanism. By connecting AD[16] and AD[18] of the secondary address to the IDSEL pins of agents 52 and 54 connected to port B 66, respectively, agents 52 and 54 will respond to configuration accesses with device numbers "1" and "2", respectively. If only two agents are connected to port B 66, a master abort error is generated when the device number reaches "3" and the BIOS stops screening of the agents. In this case, all of the agents will be appropriately detected by the BIOS.

According to the present embodiment, the algorithm of routing the configuration accesses is simple and can be implemented with hardwired circuitry.

In the present embodiment, the routing algorithm is implemented with a logic circuit. However, the present invention is not limited to such an embodiment. For instance, the function of the compare circuit may be implemented with a look-up table rather than a logic circuit.

Second Embodiment

Figure 7:
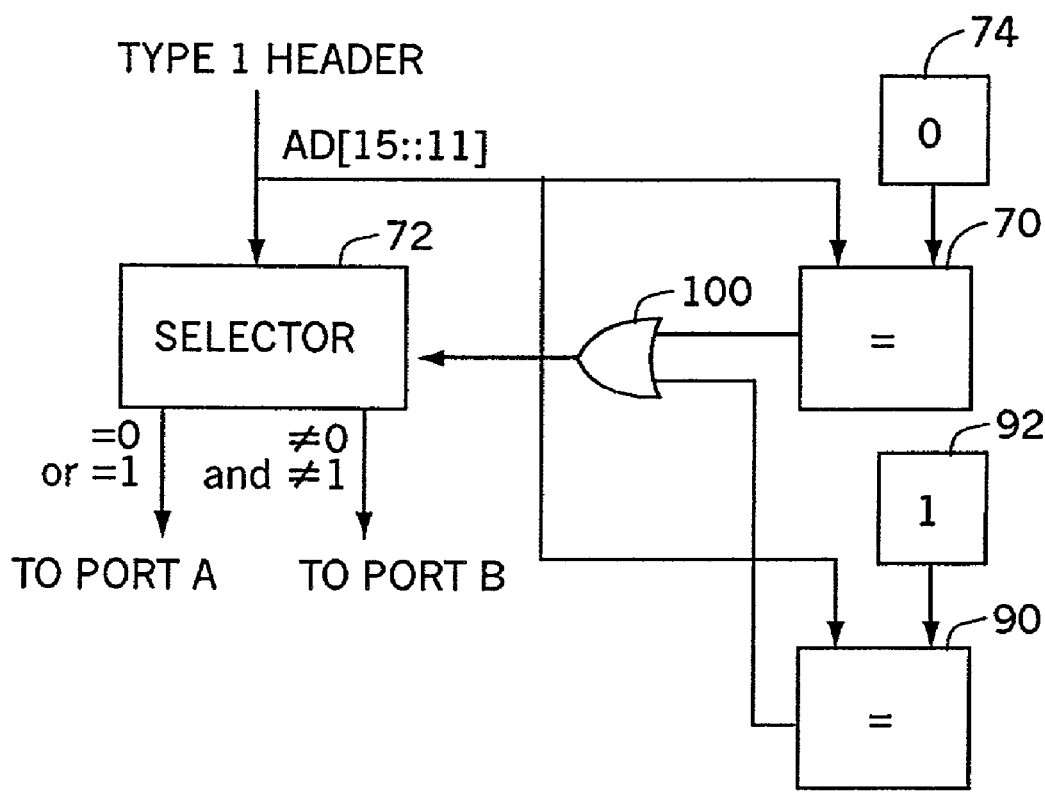
FIG. 7 is a block diagram of the circuit portion of the bridge according to the second embodiment of the present invention related to dispatching of configuration accesses.

FIG. 7 shows that portion of the logic of routing type 1 configuration accesses in a PCI-to-PCI bridge in accordance with a second embodiment of the present invention. Referring to FIG. 7, the logic includes circuit 74, compare circuit 70 and selector 72 in the first embodiment, as well as a circuit 92 for generating a value "1" by hardwired circuitry, a compare circuit 90 for comparing AD[15::11] and the output of circuit 92 and for outputting a signal that attains the high level when there is a match and the low level when there is no match, and an OR circuit 100 that has two inputs respectively receiving the outputs of circuits 70 and 90 and an output connected to selector 72.

In this second embodiment, selector 72 will route the configuration accesses to port A 64 when device number is "0" or "1", and otherwise it will route the configuration accesses to port B 66. Therefore, in a system having two agents connected to port A 64 and other agents connected to port B 66, the BIOS can appropriately detect all of the agents. In this case, AD[16] and AD[17] are connected to the IDSEL pins of the two agents connected to port A, and AD[18] and bits after AD[18] will be connected to the respective IDSEL pins of other agents connected to port B 66.

In this embodiment, a simple logic can enable the BIOS to detect all of the agents connected to a plurality of secondary ports. Note that a simple look-up table can replace the logic circuit in this embodiment also.

Third Embodiment

The third embodiment is directed to the open system with an unknown number or arrangement of devices on the secondary ports. In this case, the number of devices on each port are not fixed, thus the dispatch algorithm cannot be hardwired.

In the third embodiment, a strap is used to provide the number of devices on port A. The multi-bit strap value is latched into a register during the system-reset. After that, the bridge can utilize the register in the dispatch algorithm to decide when to toggle to port B.

Figure 8:
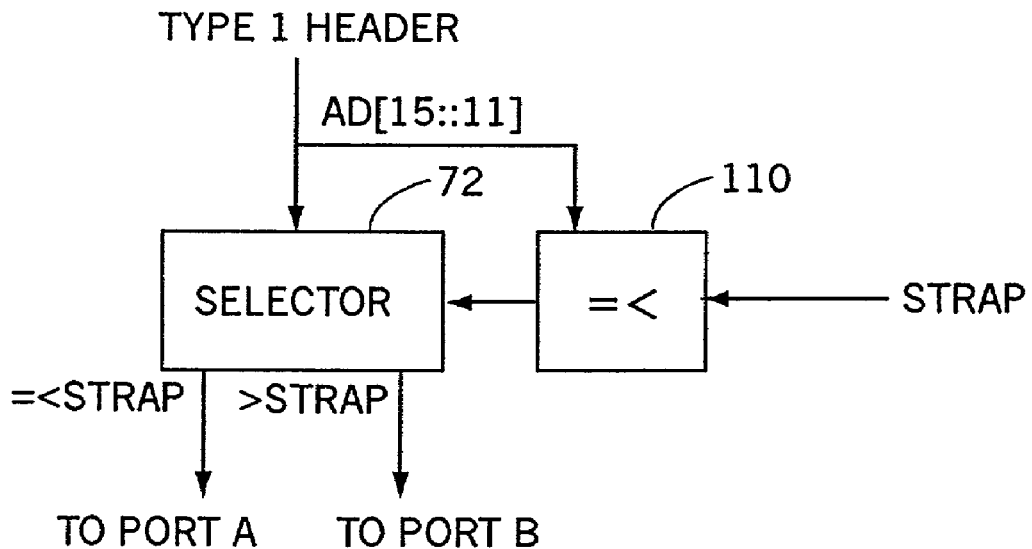
FIG. 8 is a block diagram of the circuit portion of the bridge according to the third embodiment of the present invention related to dispatching of configuration accesses.

Referring to FIG. 8, that portion of the bridge of the present invention related to dispatching algorithm includes the same selector 72 as that of the first embodiment, and a compare circuit 110 for receiving AD[15::11], i.e., the device number, of a type 1 header and a multi-bit strap value that is externally given and hold in a register (not shown), and for outputting a signal that attains the high level when the device number is equal to or less than the threshold indicated or represented by the strap value, and the low level in other cases.

Figure 9:
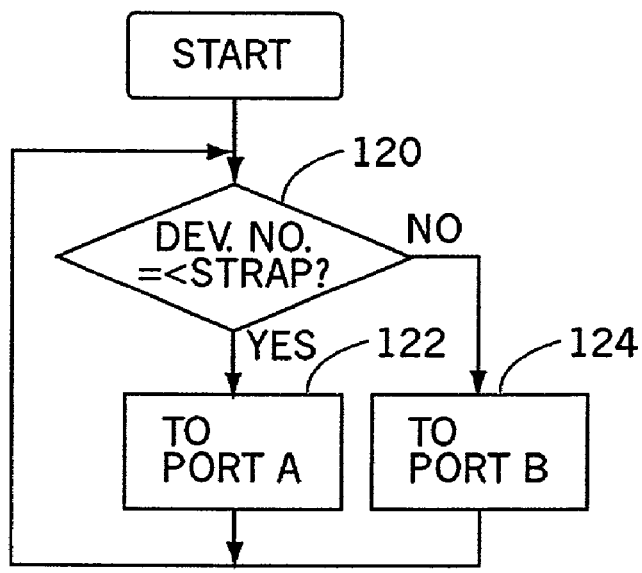
FIG. 9 is a flow chart showing operation of the circuit related to dispatching in the third embodiment.

Referring to FIG. 9, compare circuit 110 compares AD[15::11] of a type 1 header with the threshold indicated or represented by the strap value (120), and outputs the signal at the high level when the former is equal to or less than the latter to selector 72. Thus, in this case selector 72 will dispatch configuration access to port A 64 (122). Otherwise, the output of compare circuit 110 attains the low level, and the configuration accesses are dispatched to port B 66 (124). In this case also, the process will be terminated when a master abort error is encountered.

Figure 10:
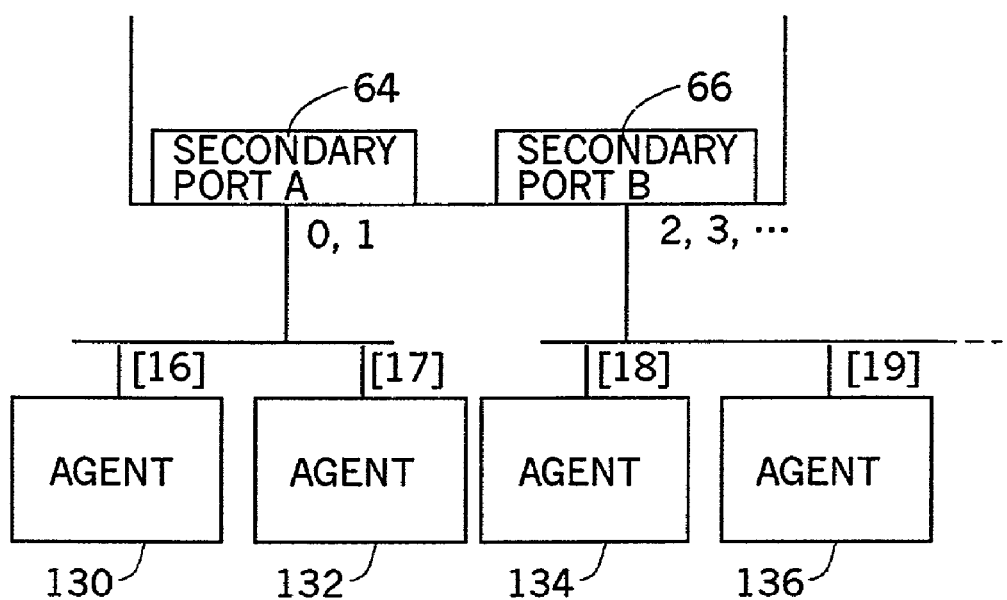
FIG. 10 is a diagram that shows the operation of the bridge according to the third embodiment.

According to the present embodiment, if two agents 130 and 132 are connected to port A 64 and if two or more agents 134, 136 and so on are connected to port B 66 as shown in FIG. 10, for example, it is possible to enable the BIOS to detect all of the agents as set forth in the following. Agents 130, 132, 134, and 136 have respective IDSEL pins, to which AD[16], AD[17], AD[18], and AD[19] are assumed to be connected, respectively.

At the outset, a value "1" is given to the present bridge on reset of a system and latched by a register (not shown). Thereafter, when the BIOS gives a type 1 head with a device number "0" to the bridge, selector 72 dispatches the configuration access to port A 64. Thus, a selection signal is tinputted to the IDSEL pin of agent 130 and agent 130 responds. When the device number is "1", the header is again dispatched to port A 64. In this case, agent 132 responds.

When the device number is "2", selector 72 dispatches the header to port B 66. Thus, an agent 134, which receives AD[18], responds. In the same manner, agents 136 and so on successively responds. When the device number is sufficiently incremented and no agent responds, a master abort error is generated and the process is terminated.

In the bridge of the present embodiment, the BIOS can detect all of the agents connected to the plurality of secondary ports during the configuration cycles, if a strap value indicating the number of agents connected to port A is given to the bridge at the time of resetting.

In the bridge of the present embodiment, even if the number of agents connected to the secondary port is changed, modification in the strap value will suffice to accommodate the change. Because relatively small amount of logic is required, it is readily implemented. Further advantageously, the BIOS does not need to care about the number of the secondary ports.

Fourth Embodiment

In the fourth embodiment, the bridge toggles between the two ports, i.e., it starts with port A, toggles to port B, toggles back to port A, etc., until a master abort error is encountered. The prerequisite for this approach is that there are exactly the same number of or one more devices on port A than on port B. If the numbers are equal, the master abort error takes place on port A, and if there is one more device on port A than on port B, the master abort error takes place on port B.

Figure 11:
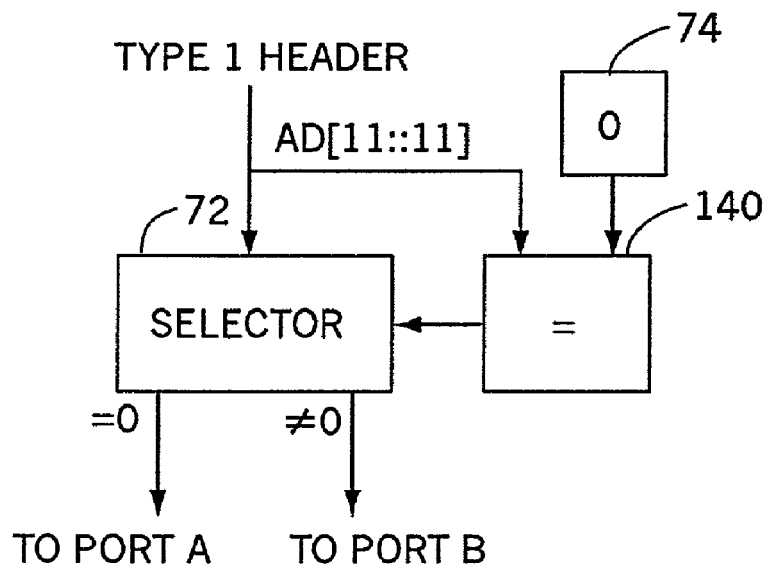
FIG. 11 is a block diagram of the circuit portion of the bridge according to the fourth embodiment of the present invention related to dispatching of configuration accesses.

FIG. 11 shows that portion of the circuit related to a dispatch algorithm of type 1 headers in the bridge of the fourth embodiment of the present invention. Referring to FIG. 11, the circuit includes circuits 74 and selector 72 as in the first embodiment as well as a compare circuit 140 receiving an output of circuit 74 and AD [11] of the primary bus address, i.e., the least significant bit (LSB) of the device number within the type 1 configuration header, for outputting a signal that attains the high level when there is a match, and the low level when there is no match.

Figure 12:
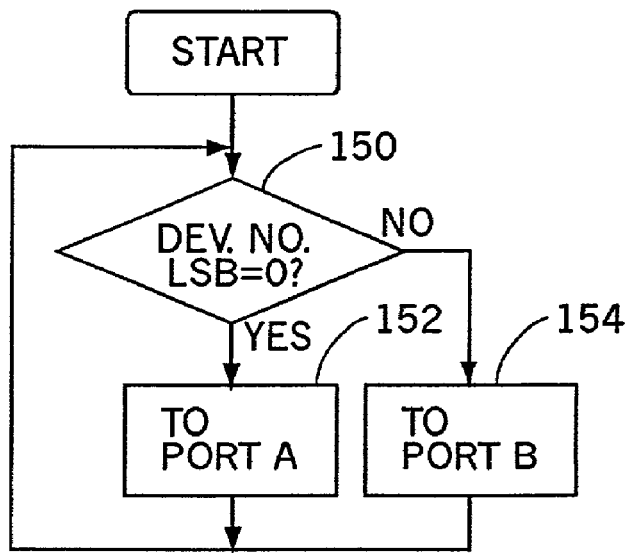
FIG. 12 is a flow chart showing operation of the circuit related to dispatching in the fourth embodiment.

Referring to FIG. 12, the bridge in accordance with the present embodiment operates as follows. The bridge determines whether the LSB of the device number within a type 1 header received from the primary port is equal to "0" (150), and if it is equal to "0", the bridge dispatches the configuration access to port A 64 (152). If it is not "0" (i.e., equals to "1"), it dispatches the configuration access to port B 66 (154).

Figure 13:
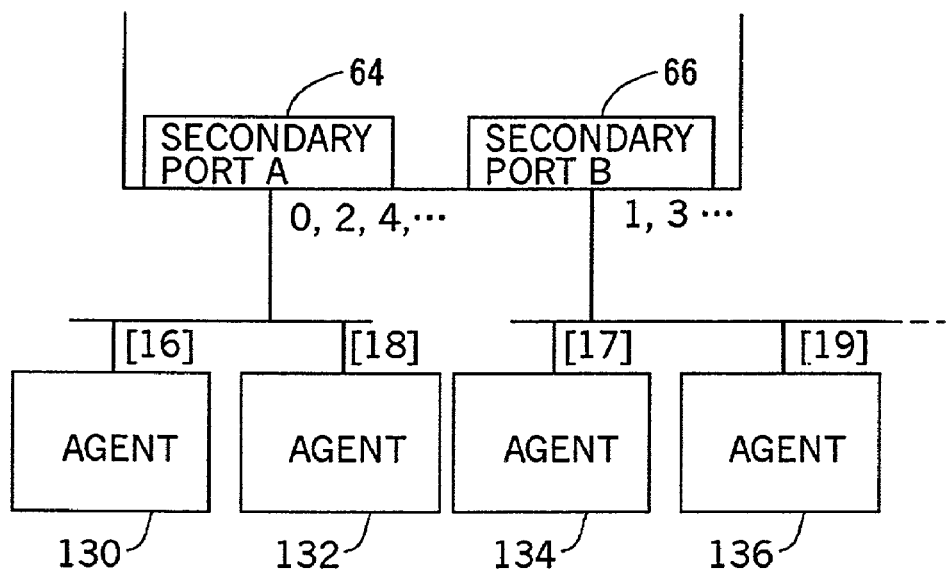
FIG. 13 shows the operation of the bridge according to the fourth embodiment.

Thus, in this case, as shown in FIG. 13, configuration accesses are dispatched to port A 64 if the device number of the type 1 header is 0, 2, 4 and so on and to port B 66 if the device number is 1, 3, 5, and so on, respectively. Therefore, when two agents 130 and 132 are connected to port A 64 and two agents are connected to port B 66, secondary addresses to be applied to the IDSEL pins of the boards of the agents will be as follows.

Figure 14:
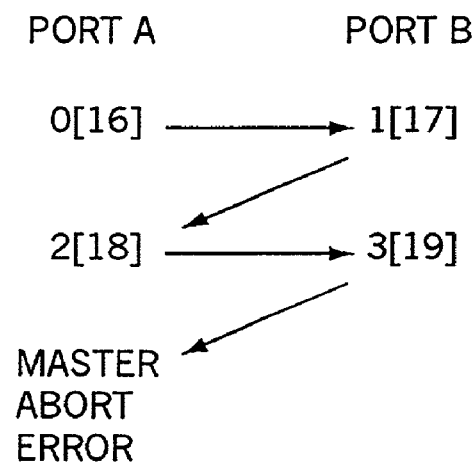
FIG. 14 shows the operation of the bridge according to the third embodiment.

AD[16], AD[18], AD[17] and AD[19] will be applied to the IDSEL pins of agent 130 (device number 0), agent 132 (device number 2), agent 134 (device number 1), and agent 136 (device number 3), respectively. Therefore, in this case, as shown in FIG. 14, configuration accesses will be dispatched in the order of port A (device number 0, AD[16]), port B (device number 1, AD[17]), port A (device number 2, AD[18]), and port B (device number 3, AD[19]). When the device number reaches 4, a master abort error will be raised because a corresponding agent does not reside on port A.

According to the present embodiment, the number of devices connected to the secondary ports will be restricted; however, all of the devices connected to the plurality of secondary ports can be detected by the BIOS with only a simple logic and without any external signal.

In the above embodiment, two ports are alternately selected with one bit (LSB) of the device number. However, the present invention is not limited to such an embodiment. Generally speaking, if the number of the secondary ports in the bridge is n-th power of two, those secondary ports can be selected in turn with n bits of the configuration accesses.

Fifth Embodiment

The complex scheme is for the bridge to detect the master abort error on port A and switch to port B based on this detection. The fifth embodiment of the present invention solves this problem by taking advantage of the fact that all the configuration accesses are delayed transactions.

Figure 15:
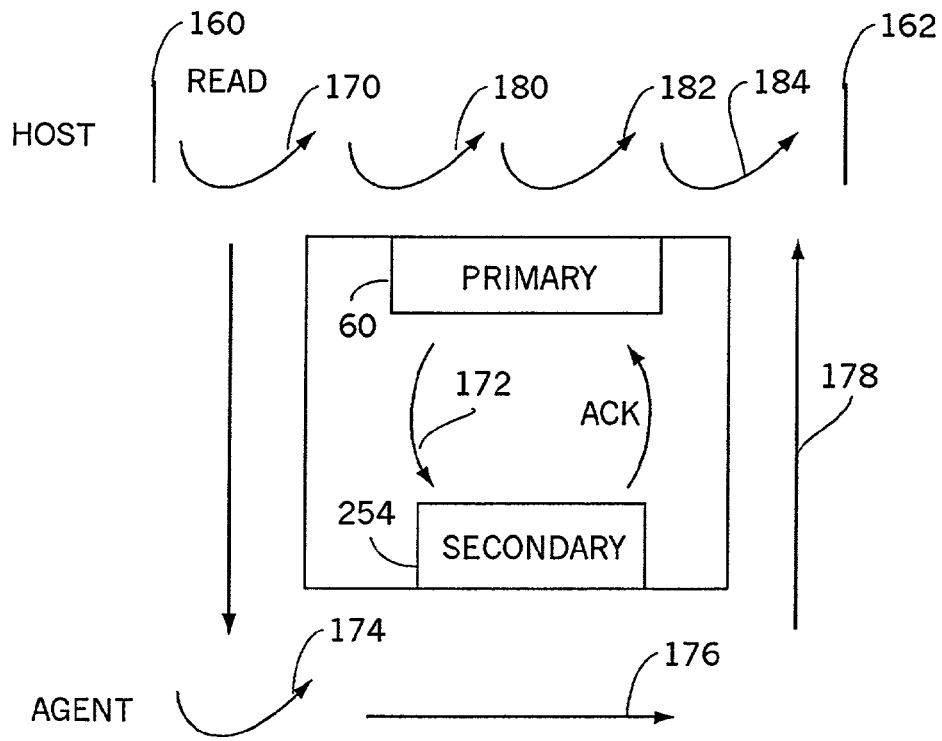
FIG. 15 shows the delayed transactions.

Referring to FIG. 15, a general description will be given about the delayed transaction used in the present embodiment. Referring to FIG. 15, assume that the host issues a READ request for some information (170). The request (172) is routed to an agent and its processing will be started, (174). In the case of a READ request, some time period will be needed in reading data from a storage area and therefore the agent can not respond to the host immediately. Meanwhile, the agent continues processing for responding to the request (176), and the host will repeats issuing READ requests (180, 182, 184) until an ACK signal is sent back from secondary port 254. When the agent is prepared for responding to the request, secondary port 254 will send back an ACK signal to primary port 60, host receives the data 178 and the transaction is concluded.

More specifically, the time period between the two vertical lines 160 and 162 in FIG. 15 is the single transaction. Because the host must wait for an ACK signal from secondary port 254 for a several clock cycles before concluding the transaction, this transaction is called a "delayed transaction".

Figure 16:
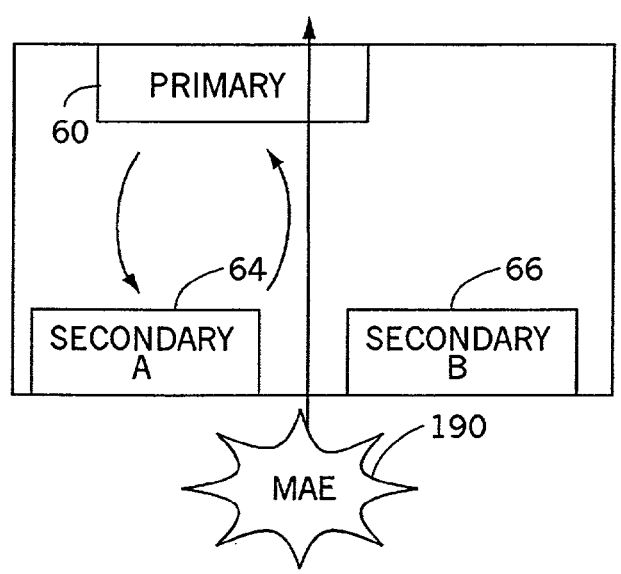
FIG. 16 shows the problem that will be encountered when two secondary ports are provided.

Referring to FIG. 16, assume that the bridge has a primary port 60 and two secondary ports 64 and 66. Like always, the dispatcher would start at port A 64, routing all configuration accesses with any device numbers until it detects a master abort on the secondary port A 64. In this case, as shown in FIG. 16, if the master abort error 190 is directly sent to the host, then the BIOS cannot scan the devices on port B 66.

Since all configuration accesses are delayed transactions, the bridge according to the present embodiment deceives the primary side by not concluding the delayed transaction on the primary side by masking a master abort (i.e., discard/suppress the master abort from port A). Instead, the bridge internally continues/copy-clones the delayed transaction on port B.

Once the delayed transaction is concluded successfully on port B, the result is provided on the primary side. After that the bridge routes all following device numbers to port B until it encounters another master abort. This time the bridge propagates the master abort into the primary side so the BIOS knows that all devices have been scanned.

Figure 17:
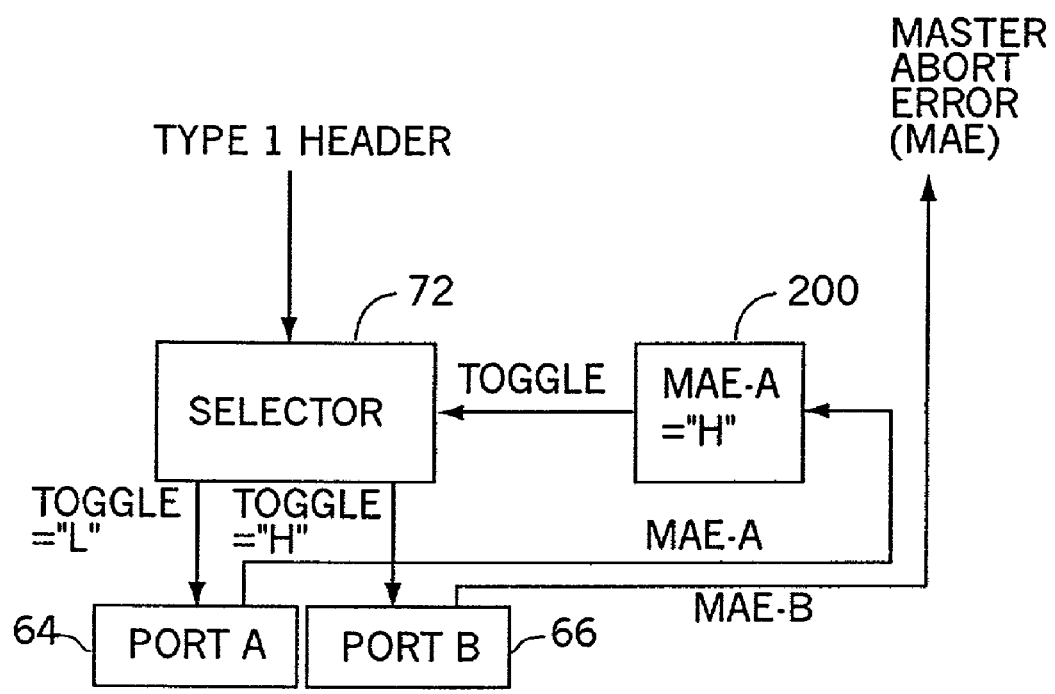
FIG. 17 is a block diagram of the circuit portion of the bridge according to the fifth embodiment of the present invention related to dispatching of configuration accesses.

Referring to FIG. 17, a dispatch circuit portion of a bridge of the fifth embodiment includes the same selector 72 as in the first embodiment, and a toggle circuit 200 that is connected to receive a master abort signal MAE-A from port A 64, for outputting a signal TOGGLE that assumes the low level before the signal MAE-A is encountered, and the high level after the signal MAE-A is encountered, respectively.

Figure 18:
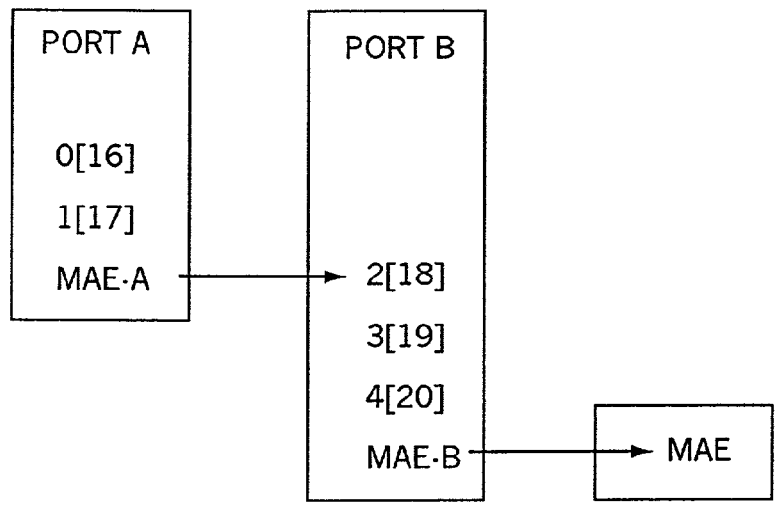
FIG. 18 is a flow chart showing operation of the bridge in accordance with the fifth embodiment.

Referring to FIG. 18, the dispatch circuit operates as follows. Note that it is assumed that two agents (device numbers 0 and 1, respectively) are connected to port A 64 in FIG. 17, and three agents (device numbers 2, 3 and 4, respectively) are connected to port B 66.

At the outset, the device number is zero and the signal TOGGLE is at the low level; therefore, a configuration access is dispatched to port A 64. Thus, a device with a device number zero that receives AD[16] of the secondary address as an IDSEL will respond to the configuration access.

The same operation is repeated when the device number is 1 (one). A device connected to port A 64 with device number 1 that receives secondary address AD[17] will respond.

When the device number is 2, the configuration access is dispatched to port A 64 at first; however, no device with device number 2 is connected to port A 64. No device will respond and port A 64 will raise a master abort error signal MAE-A. The signal MAE-A, however, will not be transferred to primary port 60, but applied to toggle circuit 200. Toggle circuit 200, therefore, changes the level of its output TOGGLE from low to high.

In response to high level signal TOGGLE, selector 72 now dispatches the same configuration access to port B 66. A device with a device number 2 corresponding to secondary address AD[18] is connected to port B 66; therefore, that device will respond to the BIOS. Because the transaction is a delayed transaction, the host will repeat retries until an ACK signal is returned from any secondary port. Thus, the master abort error MAE-A will not be sent to the BIOS.

Thus, the devices connected to port B 66 with device numbers 3 and 4, respectively, corresponding to secondary addresses AD[19] and AD[20], respectively, will respond and be detected by the BIOS.

When the device number reaches 5, a master abort error is raised in port B 66 and its signal MAE-B is transferred to BIOS. The BIOS then concludes the scanning of agents.

According to the present embodiment, any system with a plurality of secondary ports can be appropriately configured. Because the switching of secondary ports is transparent to the BIOS, there is no need to modify the BIOS configuration.

Sixth Embodiment

During Boot-Up, the device driver is still inactive, thus a mechanism has to be implemented to ensure that the system can boot properly in VGA mode. If, however, there are a plurality of VGA devices connected to plurality of secondary ports, it would be difficult to predict which VGA device will be used in VGA mode, specifically in all VGA related cycles. Therefore, in the present embodiment, one of the plurality of VGA devices is defined as a default VGA device using a strap, for example.

Figure 19:
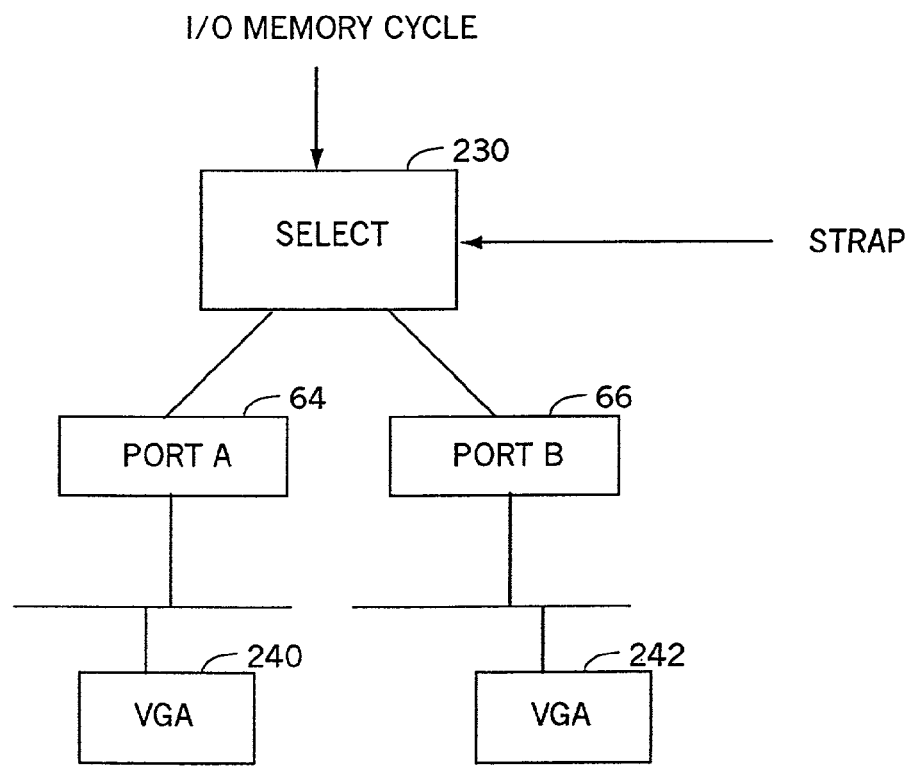
FIG. 19 is a block diagram of the circuit portion of the bridge according to the sixth embodiment of the present invention related to dispatching of configuration accesses.

Referring to FIG. 19, that circuit portion of the bridge of the present embodiment that controls accesses to VGA devices during VGA related cycles includes a selector 230 for selectively routing accesses to port A 64 or port B 66 dependent of a value of the signal STRAP externally applied and latched in a register (not shown).

Let us assume that a VGA device 240 is connected to port A 64 and another VGA device 242 is connected to port B 66. If the value of the signal STRAP indicates port A 64, all of the VGA accesses are routed to port A 64. Therefore, VGA 240 is selected as a default VGA device. If the value of the signal STRAP indicates port B 66, all of the VGA accesses are routed to port B 66. Therefore, VGA 242 is selected as a default VGA device.

Because a default device can be predesignated, a bridge with a plurality of secondary ports may be handled like that with only one secondary port. Because any VGA device on any secondary port may be predesignated, the bridge will be conveniently utilized.

Although the present invention has been described and illustrated in detail, it is clearly understood that the same is by way of illustration and example only and is not to be taken by way of limitation, the spirit and scope of the present invention being limited only by the terms of the claims and the equivalents thereof.

What is claimed is:

1. In a bridge for interfacing a device on a primary bus connected to a primary port with devices on a plurality of secondary ports including a first secondary port and a last secondary port, respectively connected to separate secondary buses, a method of routing configuration accesses applied from the primary port to the plurality of secondary ports wherein:
   the configuration accesses each designate a device number and request a response from the device having the designated device number; and
   each of the devices connected to the plurality of secondary ports are configured to respond to a designated device number;
   the method comprising the steps of:
   distributing a plurality of configuration accesses received from the primary port to the plurality of secondary ports in accordance with a predetermined algorithm, such that each of the devices on the secondary ports receives and responds to exactly a single access; and
   terminating configuration cycles after distributing the plurality of configuration accesses.

2. A method according to claim 1, wherein
   numbers of the devices on the plurality of secondary ports are respectively predetermined, and wherein
   the step of distributing includes the step of repeating, for each of the secondary ports, the step of: applying a respective predetermined number of consecutive configuration accesses received from the primary port to the each of the secondary ports.

3. A method according to claim 1, wherein
   numbers of the devices on the plurality of secondary ports are respectively predetermined except for the last secondary port, and
   the secondary ports having a capability of generating an error signal if no devices connected to the secondary ports responds to the applied configuration access; and
   wherein the step of distributing includes the step of
   repeating, for each of the secondary ports except the last secondary port, the step of: applying a respective predetermined number of consecutive configuration accesses received from the primary port to the each of the secondary ports except the last secondary port, and
   repetitively applying subsequently applied configuration accesses to the last secondary port until the last secondary port generates an error signal.

4. A method according to claim 1, wherein
   said step of distributing includes the steps of:
   receiving an external signal that represents numbers of devices on each of the plurality of the secondary ports,
   repeating, for each of the secondary ports, the step of: applying a respective number of consecutive configuration accesses received from the primary port to the each of the secondary ports, the respective number being equal to the number represented by the external signal for the each of the secondary ports.

5. A method according to claim 1, wherein
   the secondary ports having a capability of generating an error signal if no devices connected to the secondary ports responds to the applied configuration access; and wherein
   said step of distributing includes the steps of:
   receiving an external signal that represents numbers of devices on each of the plurality of the secondary ports except for the last secondary port,
   repeating, for each of the secondary ports except for the last secondary port, the step of applying a respective number of consecutive configuration accesses received from the primary port to the each of the secondary ports, the respective number being equal to the number represented by the external signal for the each of the secondary ports except for the last secondary port, and
   repetitively applying subsequently applied configuration accesses to the last secondary port until the last secondary port generates an error signal.

6. A method according to claim 1, wherein
   the secondary ports having a capability of generating an error signal if no devices connected to the secondary ports responds to the applied configuration access; and wherein
   the step of distributing includes the step of:
   repeating the step of routing a plurality of configuration accesses received from the primary port to the secondary ports in a predetermined order so that each of the secondary ports receives exactly the same number of access, until one of the secondary ports generates an error signal.

7. A method according to claim 6, wherein
   the step of routing includes the step of:
   routing a plurality of configuration accesses received from the primary port to the secondary ports in a predetermined order so that each of the secondary ports receives exactly one access.

8. The method in accordance with claim 6, wherein
   a number of the plurality of secondary ports equals to the n-th power of two, where n is a natural number, and wherein
   the step of routing includes a step of routing a plurality of configuration accesses received from the primary port to the plurality of secondary ports in an order determined as a function of predetermined n bits of a predetermined field of the configuration accesses.

9. The method in accordance with claim 8, wherein
   the plurality of secondary ports include two secondary ports, and the n equals to one.

10. A method according to claim 1, wherein
    the secondary ports having a capability of generating an error signal if no devices connected to the secondary ports responds to the applied configuration access; and wherein
    the step of distributing includes the steps of repeating, for each of the secondary ports except for the last secondary port, the steps of:
    applying consecutive configuration accesses received from the primary port to the each of the secondary ports except for the last secondary port, until the each of the secondary ports except for the last secondary port generates an error signal, and
    suppressing the generated error signal; and
    applying consecutive configuration accesses received from the primary port to the last secondary port, until the last secondary port generates an error signal.

11. In a bridge for interfacing a device on a primary bus connected to a primary port with devices on a plurality of secondary ports respectively connected to separate secondary buses, a method of determining a display device that operates in accordance with a basic specification utilized in system boot-up, the method comprising the steps of:
- receiving a programmable signal designating one of the plurality of secondary ports; and
- routing, in response to a device access related to the display device from the primary port in a boot-up of the system, the access to a secondary port designated by the programmable signal.

12. In a bridge for interfacing a device on a primary bus connected to a primary port with devices on a plurality of secondary ports including a first secondary port and a last secondary port, respectively connected to separate secondary buses, a apparatus of routing configuration accesses applied from the primary port to the plurality of secondary ports wherein:
- the configuration accesses each designate a device number and request a response from the device having the designated device number; and
- each of the devices connected to the plurality of secondary ports are configured to respond to a designed device number;

the apparatus comprising:
- a circuit that distributes a plurality of configuration accesses received from the primary port to the plurality of secondary ports in accordance with a predetermined algorithm, such that each of the devices on the secondary ports receives and responds to exactly a single access; and
- a circuit that terminates configuration cycles after distributing the plurality of configuration accesses.

13. A apparatus according to claim 12, wherein
numbers of the devices on the plurality of secondary ports are respectively predetermined, and wherein
the circuit of distributing includes the circuit that repeats, for each of the secondary ports, applying a respective predetermined number of consecutive configuration accesses received from the primary port to the each of the secondary ports.

14. A apparatus according to claim 12, wherein
numbers of the devices on the plurality of secondary ports are respectively predetermined except for the last secondary port, and
the secondary ports having a capability of generating an error signal if no devices connected to the secondary ports responds to the applied configuration access; and wherein
the distributing circuit includes:
- a circuit that repeats, for each of the secondary ports except the last secondary port, applying a respective predetermined number of consecutive configuration accesses received from the primary port to the each of the secondary ports except the last secondary port; and
- a circuit that repetitively applies subsequently applied configuration accesses to the last secondary port until the last secondary port generates an error signal.

15. A apparatus according to claim 12, wherein
the distributing circuit includes:
- a circuit that receives an external signal that represents numbers of devices on each of the plurality of the secondary ports; and
- a circuit that repeats, for each of the secondary ports, applying a respective number of consecutive configuration accesses received from the primary port to the each of the secondary ports, the respective number being equal to the number represented by the external signal for the each of the secondary ports.

16. A apparatus according to claim 12, wherein
the secondary ports having a capability of generating an error signal if no devices connected to the secondary ports responds to the applied configuration access; and wherein
the distributing circuit includes:
- a circuit that receives an external signal that represents numbers of devices on each of the plurality of the secondary ports except for the last secondary port;
- a circuit that repeats, for each of the secondary ports except for the last secondary port, applying a respective number of consecutive configuration accesses received from the primary port to the each of the secondary ports, the respective number being equal to the number represented by the external signal for the each of the secondary ports except for the last secondary port; and
- a circuit that repetitively applies subsequently applied configuration accesses to the last secondary port until the last secondary port generates an error signal.

17. A apparatus according to claim 12, wherein
the secondary ports having a capability of generating an error signal if no devices connected to the secondary ports responds to the applied configuration access; and wherein
the distributing circuit includes:
- a circuit that repeats routing a plurality of configuration accesses received from the primary port to the secondary ports in a predetermined order so that each of the secondary ports receives exactly the same number of access, until one of the secondary ports generates an error signal.

18. A apparatus according to claim 17, wherein
the routing circuit includes:
- a circuit that routes a plurality of configuration accesses received from the primary port to the secondary ports in a predetermined order so that each of the secondary ports receives exactly one access.

19. The apparatus in accordance with claim 17, wherein
a number of the plurality of secondary ports equals to the n-th power of two, where n is a natural number, and wherein
the routing circuit includes a routing circuit that routes a plurality of configuration accesses received from the primary port to the plurality of secondary ports in an order determined as a function of predetermined n bits of a predetermined field of the configuration accesses.

20. A apparatus according to claim 12, wherein
the secondary ports having a capability of generating an error signal if no devices connected to the secondary ports responds to the applied configuration access; and wherein
the distributing circuit includes
- a circuit that repeats, for each of the secondary ports except for the last secondary port,
- applying consecutive configuration accesses received from the primary port to the each of the secondary ports except for the last secondary port, until the each of the secondary ports except for the last secondary port generates an error signal, and
- suppressing the generated error signal, and
- a circuit that applies consecutive configuration accesses received from the primary port to the last secondary port, until the last secondary port generates an error signal.

* * * * *

UNITED STATES PATENT AND TRADEMARK OFFICE
CERTIFICATE OF CORRECTION

PATENT NO. : 7,054,979 B2
APPLICATION NO. : 09/985009
DATED : May 30, 2006
INVENTOR(S) : Robert Streitenberger et al.

It is certified that error appears in the above-identified patent and that said Letters Patent is hereby corrected as shown below:

On the Title page of the Letters Patent,

Under Item "(56) References Cited, OTHER PUBLICATIONS", add:

-- PCI to PCI Bridge Architecture Specification Rev. 1.1", Special Interest Group, Chapter 3, pp. 19-25 --

Signed and Sealed this

Sixth Day of February, 2007

JON W. DUDAS
*Director of the United States Patent and Trademark Office*